UNITED STATES PATENT OFFICE.

JOHN J. CROOKE AND ROBERT CROOKE, OF NEW YORK, N. Y.

PROCESS OF SEPARATING THE METALS FROM COPPER MATTE.

SPECIFICATION forming part of Letters Patent No. 308,031, dated November 11, 1884.

Application filed August 8, 1884. (Specimens.)

*To all whom it may concern:*

Be it known that we, JOHN J. CROOKE and ROBERT CROOKE, citizens of the United States, residing in the city of New York, county of New York, and State of New York, have invented a certain new and useful Improvement in Process of Separating the Metals from Copper Matte, of which the following is a full, clear, and exact description and specification.

These improvements in the treatment of arsenical and other impure copper matte have in view not only the recovery of the silver and gold usually associated with all cupriferous regulus, but the economical conversion and separation of the copper in a condition of nearly absolute purity. The smelting of argentiferous galena ores carrying small percentages of copper is assuming in this country valuable industrial proportions, the reduction of such ores necessitating the constant production of a concentrated argentiferous and auriferous copper regulus. The bulk of these valuable products is also swollen by large and increasing contributions from Montana and other western localities. The mattes, however, from these various sources are as a rule associated with arsenic, antimony, iron, lead, and other metallic sulphurets inimical to the economical production of pure copper by the various processes now in use.

To eliminate the objectionable elements, to recover the silver and gold, and to produce with great rapidity a pure desilverized copper at a minimum cost is the object of our invention.

Appended is a description of the various steps in our process. The regulus is prepared for treatment by being broken and ground to pass a forty-mesh screen. The furnace used for the desilverizing process is of the reverberatory type, large enough to contain two tons of matte spread upon the sole to the depth of six inches. This furnace has an ordinary tap and carries work side and end doors. At the tap side are conveniently located two iron lead-kettles of a capacity of ten tons each. The first step in the desilverizing process is to bring the interior of the furnace to a dull red heat. Three tons of lead are now placed in the furnace and brought to incipient redness. Upon this is charged two tons of the ground argentiferous matte. The lead and the matte are rabbled together. At a dull red temperature the lead is entirely absorbed. Oxidation of a portion of the sulphur now takes place. The temperature increases throughout the mass. It is at this moment that the reduction and alloying of the silver, gold, antimony, and arsenic with the lead occur. The heat is now kept stationary and the charge again thoroughly rabbled for about fifteen minutes. During this rabbling about sixty per cent. of the lead used is liberated and separates from the matte. At the end of a half-hour the furnace is tapped and the lead laundered into one of the ten-ton kettles. The tap is now closed and two tons of fresh lead placed in the furnace. The pasty mass of matte is again rabbled with this additional lead, and at end of a half-hour the lead is tapped into the kettle, mixing with the lead of the first charge. Both of these lead applications must be made at a low temperature. The lead must be kept below a red heat. If the matte is allowed to melt, only a small portion of the silver and other metals will be reduced. The success of the operation depends upon the observance of a low temperature. The charge which is now in a plastic condition is removed through the doors for subsequent treatment, leaving the furnace clear for a fresh charge of matte. The lead used can be built up in silver by being worked with fresh charges of matte; but practice has demonstrated that lead once used has not the desilverizing power of fresh lead or lead freed from antimony, arsenic, &c., by zincing; hence we prefer to use clean lead and make clean work. The desilverized charge just removed, carrying a large percentage of lead, is placed in a reverberatory furnace running at a high temperature. While the charge is still pasty four hundred pounds (or ten per cent.) of anthracite-coal slack is rabbled in, and the reduction of a certain portion of the lead allowed to proceed. This amount of carbon will remove all the lead contained in the matte up to within about five hundred pounds. This twelve and one-half per cent. is purposely retained. The reduced lead containing a little silver is tapped off and recovered. The melted matte is allowed to fall into sand molds, and and is now ready for the treatment for copper. Of the ten thousand pounds of lead used nine thousand five hundred will be at once recovered as metal, and this metal will contain all the silver up to within from a quarter to a half ounce of the original assay of the matte before treatment, together with all the gold, antimony, and nearly all the arsenic, with a fraction of one per cent. of copper, which is ultimately recovered. Ten thousand pounds of lead will treat and desilverize four thousand pounds of matte running from one to five hundred ounces of silver per ton. The lead laundered into the kettles parts with the trifling amount of copper it may contain, which is skimmed off as a dry dross. This dross is added to the next carbon reduction charge, and is recovered as sulphide of copper and the adhering lead reduced to metal; or the dross may, upon the collection of a quantity, be treated alone for copper and lead by fusion with two and one-half per cent. of sulphur. The copper will separate as sulphide, the lead as metal alloyed with whatever silver the dross may have contained. The kettle-lead is treated for silver and gold in the usual manner by the zinc method. The lead after zincing can be at once used to desilverize a fresh charge of regulus. The process being continuous, large quantities of matte can be handled with rapidity and economy. The lead loss will not amount to over one per cent. The total loss of units of copper contained in the raw matte will not amount to a half of one per cent. The antimony and arsenic are found in the run-slags from the silver cupellation, which, when reduced, furnish a merchantable article. The lead contents of blast-furnace mattes, usually amounting to twenty per cent., will by this treatment be recovered. The desilverized regulus, which was treated with carbon and tapped into sand molds, or non-desilverized copper regulus, which has been charged with a small per cent. of lead and subjected to the carbon process, we subject to the following rapid treatment for copper: The stock is broken to allow the largest fragments to pass a half-inch mesh. It is charged into a reduction-furnace of five tons capacity. This furnace is one of the reverberatory form, with side and end doors. Upon each side just back of the fire-bridge is an opening for a two-inch tuyere, each of which openings is furnished with a one-inch tuyere. These tuyeres are arranged to sweep with an air-blast over the furnace-sole diagonally in the direction of the end door. The charge is gradually brought to a red heat and occasionally rabbled. It soon becomes dry. The heat is now increased and the blast is opened on the fuming stock. The mass will not clot if the temperature is kept somewhat below the melting-point of copper. At this stage the charge is constantly rabbled. In the course of an hour moss copper begins to form upon the superfices of every module in the furnace. The metal gradually thickens, running into capillary wire, leaf, and sheet copper, penetrating from the exterior to the interior. This scorifying action between the lead and sulphide of copper continues until the whole mass apparently becomes metallic. At this stage samples must be ocasionally drawn and plunged into water. When the fragments of copper upon trial no longer present a bright appearance, owing to the surface formation of protoxide or black oxide of copper, (Cu O,) the blast is shut off from the charge. The whole operation occupies about four hours at the longest. The stock now contains from five to seven per cent. of sulphur. The iron is in the state of protoxide, the lead as oxide and sulphate, the copper as metal, sulphate, and disulphate. For every twelve per cent. of iron contained in the original matte, eight per cent. of quartzose sand is now added. (The addition of silica to the charge converts the sulphate of lead to oxide and forms a silicate with the iron.) The heat is now raised to a copper fusion. Copper begins to melt and slag to form. If the slag presents a fine pure black color, they will be found quite free from copper; but if they exhibit a red or red-black color, showing the presence of dioxide of copper, the addition of one per cent. of desilverized raw matte will at once clean the slag of copper. The amount of slag made by this process from mattes carrying from fifty-five to sixty per cent. copper with twelve per cent. of iron, will average about seven hundred pounds to the ton of matte, and should not run, at the maximum, over one per cent. in copper. When the slag is found to be of proper color, and consequently poor in copper, it is withdrawn by means of a skimming-tool in the usual manner through the end door. The bath is now watched, and as fast as slag forms it is withdrawn. These ferruginous black slags carry from thirty-five to thirty-eight per cent. of lead. They are the only slags made, and are easily reduced by means of carbon, the metal being recovered at a slight cost. When the copper from which the slag has been removed ceases to boil and oxide of copper begins to form on the surface, the metal is at once tapped into sand molds. This copper occasionally carries some dioxide; but is excellent for brass castings, and if tapped at the right moment is as tough as best-selected copper. The tapped metal from the sand molds is again melted in an ordinary refining-furnace, and brought to tough pitch by the reduction of whatever oxide of copper it may have absorbed. This copper will then forge, roll into foil, and draw down to hair wire. It is free from lead and iron, and however arsenical the matte may have been, not a trace of arsenic will be found in the metal.

What we claim is—

1. In the art of treating copper regulus, the process consisting in first bringing a quantity of lead to a state of incipient redness, then combining therewith a quantity of ground argentiferous copper matte by agitation, and thereby bringing the mass to a temperature producing dull redness without fusing the matte, and then tapping off the freed lead for further treatment, substantially as described.

2. In the art of treating copper regulus, the process consisting in first bringing a quantity of lead to a state of incipient redness, then combining therewith a quantity of ground argentiferous copper matte by agitation, and thereby bringing the mass to a temperature producing dull redness without fusing the matte, then tapping off the freed lead, then again combining a quantity of lead with the matte, again agitating the mass until brought to a state of dull redness, and tapping off the freed lead, substantially as described.

3. In the art of treating copper regulus, the process of treating the charge resulting from the removal of silver, gold, antimony, and arsenic from copper matte by combining lead therewith, rabbling the mass, and drawing off the freed lead, the same consisting in rabbling into the mass at high temperature a quantity of coal, whereby the greater portion of lead contained in the matte is reduced and the matte melted, substantially as described, 4. The process of treating copper regulus for the recovery of copper, the same consisting in combining a small per cent. of lead with the regulus, then roasting the same while subjected to a blast and under agitation at a temperature slightly less than that at which copper melts, substantially as described.

5. The process of refining copper regulus combined with lead, substantially as described, the same consisting in scorifying the mass by subjecting the same to a blast until it becomes metallic, then adding silica thereto, and then subjecting the stock to a temperature producing copper fusion until the melted copper ceases to boil, substantially as described.

6. In the art of treating copper regulus, the process consisting of the following steps: in first bringing a quantity of lead to a state of incipient redness and combining therewith a quantity of ground argentiferous copper matte by agitation and heat at a temperature that will not fuse the matte, then, after removing the freed lead, rabbling into the mass a quantity of coal while the whole is subjected to a melting-temperature less than that at which copper melts, then scorifying the mass by subjecting it to a blast until it becomes metallic, and then adding silica thereto and subjecting the mass to a heat producing copper fusion until the melted copper ceases to boil, substantially as described.

In testimony whereof we have hereunto set our hands in the presence of two subscribing witnesses.

JOHN J. CROOKE.
ROBERT CROOKE.

Witnesses:
T. H. PALMER,
GEO. H. GRAHAM.